United States Patent [19]

Komazawa et al.

[11] Patent Number: 4,957,309
[45] Date of Patent: Sep. 18, 1990

[54] PRESSURE CONTROL SYSTEM FOR SUSPENSION

[75] Inventors: Osamu Komazawa, Nagoya; Shigetaka Isogai, Nishio; Shuuichi Buma, Toyota; Toshio Onuma, Susono; Takashi Yonekawa, Mishima; Katsuhiko Hattori, Nagoya, all of Japan

[73] Assignees: Toyota Jidosha Kabushiki Kaisha, Toyota; Kabushiki Kaisha Toyota Chuo Kenkyusho; Aisin Seiki Kabushiki Kaisha, both of Aichi, all of Japan

[21] Appl. No.: 458,240

[22] Filed: Dec. 27, 1989

[30] Foreign Application Priority Data

Dec. 29, 1988 [JP] Japan .................................. 63-331365
Dec. 29, 1988 [JP] Japan .................................. 63-331366
Jan. 31, 1989 [JP] Japan .................................... 1-22246

[51] Int. Cl.$^5$ ............................................. B60G 11/26
[52] U.S. Cl. .............................. 280/707; 280/DIG. 1; 364/424.05
[58] Field of Search ......................... 280/707, DIG. 1; 364/424.05

[56] References Cited

U.S. PATENT DOCUMENTS

| 4,463,969 | 8/1984 | Harrison | 280/707 |
| 4,546,960 | 10/1985 | Abrams et al. | 280/707 |
| 4,702,843 | 10/1987 | Oswald et al. | 280/707 |
| 4,831,532 | 5/1989 | Kondo | 280/707 |

Primary Examiner—Kenneth R. Rice
Attorney, Agent, or Firm—Burns, Doane, Swecker & Mathis

[57] ABSTRACT

A pressure control system for suspension delivers a pressure which is proportional to a current level chosen to energize a solenoid of a pressure control valve to a shock absorber of a suspension. A change in the pressure of a return path which supplies a low pressure to the pressure control valve causes the pressure which is applied to the suspension to change. In order to suppress such change, a junction of the pressure control valve with the return path has an orifice interposed therein or is connected to a low pressure accumulator. On the other hand, in the event a depression occurs in the output of the high pressure piping, a cut valve which functions to isolate the suspension from the pressure control valve may be temporarily cut off in response to a pressure fluctuation in the high pressure piping. In order to prevent this, an orifice is interposed between the high pressure piping and a pilot chamber of the cut valve.

8 Claims, 10 Drawing Sheets

PRESSURE CONTROL SYSTEM FOR SUSPENSION

FIELD OF THE INVENTION

The invention relates to a pressure control of suspensions for a vehicle, in particular, to a mechanism which regulates a suspension pressure for suppressing a change in the attitude of a car body which may be caused by a steering operation and accelerating/decelerating operation.

THE PRIOR ART

Japanese Utility Model Publication No. 38,402/1987, for example, discloses a suspension pressure control in which a sensor is used to detect a steering angular velocity and a suspension pressure is increased when a vehicle speed is above a given value and a steering velocity is also above a given value.

Japanese Laid-Open Patent Application No. 106,133/1988 discloses a pressure control system in which a turning pattern of a vehicle is determined on the basis of a steering angle and a steering angular velocity, and a constant of proportionality applied to a correction to the suspension or a gain which is determined in proportion to a lateral acceleration applied to the vehicle is modified in a corresponding manner. A pressure which is required of the suspension is calculated in a manner corresponding to the gain and the lateral acceleration of the vehicle, and a pressure control valve is energized in accordance with such required pressure, thus applying the required pressure to the suspension from the pressure control valve.

In such suspension pressure control, a required pressure is applied to a suspension from a pressure control valve. By way of example, the pressure control valve may comprise a line pressure port communicating with a high pressure piping, a low pressure port communicating with a fluid return path leading to a reservoir, an output port for delivering a pressure to the suspension, a target pressure space communicating with the line pressure port through an orifice, a spool responsive to a pressure from the output port applied to its one end to be driven in a direction to reduce a degree of communication between the line pressure port and the output port and to increase a degree of communication between the low pressure port and the output port and also responsive to a pressure from the target pressure space applied to its other end to be driven in a direction to increase a degree of communication between the line pressure port and the output port and to reduce a degree of communication between the low pressure port and the output port, a valve element for defining a degree of communication between the target pressure space and the fluid return path to the reservoir, and a solenoid for driving the valve element in a direction to increase/decrease the degree of communication (see, for example, Japanese Laid-Open Patent Application No. 106,133/1988). By controlling the current level at which the solenoid is energized, a force which maintains the valve element balanced to be determined to create a corresponding required pressure in the target pressure space, and a pressure which is equivalent to the pressure in the target pressure space may be delivered to the output port or the suspension.

However, because the pressure control valve is constructed so that a pressure in a target pressure space is established by adjusting a degree of communication with the fluid return path to the reservoir by means of the valve element, a fluctuation in the pressure of the return path causes a corresponding fluctuation in the pressure of the target pressure space with respect to a reference which may be an atmospheric pressure, for example, and a resulting variation causes a variation or an error in the pressure applied to the suspenion from the output port. Because of the mechanical construction, a relatively high pressure from the output port is discharged to the return path as the spool moves in the single pressure control valve, whereby such pressure is directly transmitted to the space which operates to actuate the valve element, causing a pressure error.

In addition, when a pressure surge is applied to the output port as when a wheel associated with the suspension is impacted by bumps, such surge is similarly transmitted to the valve operating space, again causing a pressure error. When a pressure control valve is connected to each of a pair of front wheel suspensions and a pair of rear wheel suspensions, a pressure surge applied to the output port of a single pressure control valve may be transmitted through the return path to the valve operating space of other pressure control valves, causing a pressure error thereof. An erroneous fluctuation of the output pressure from one pressure control valve which may be caused by one wheel being impacted by bumps may ripple to other pressure control valves, with consequence that a pressure control of the individual suspensions become unstable and subject to pressure errors.

On the other hand, if the pressure of the high pressure piping decreases below its given level, the pressure in the target pressure space will fall, and a spool will be driven in a direction to reduce a degree of communication between the line pressure port and the output port and to increase a degree of communication between the low pressure port and the output port, thus lowering the pressure of the output port. In other words, the pressure from the output port or the suspension pressure will fall in response to a pressure fall in the high pressure piping. It is necessary that such reduction in the suspension pressure be prevented.

A reduction in the suspension pressure which occurs in the manner mentioned above can be prevented by providing a cut valve unit between the output port of the pressure control valve and the suspension. The cut valve unit comprises a pilot pressure space responsive to a pressure in the high pressure piping, an input port responsive to a pressure which is regulated by the pressure control valve, an output port communicating with the suspension, a valve element driven by a pressure from the pilot pressure space to establish a communication between the input and the output port, and a spring member for urging the valve element in a direction to interrupt the communication between the input and the output port. With this arrangement, when a pressure in the high pressure piping falls below a pressure level which is balanced with the resilience of the spring member of the cut valve unit, the latter automatically operates to interrupt the communication between the pressure control valve and the suspension, thus automatically preventing the suspenion from relieving its pressure to the pressure control valve.

When such cut valve unit is used, it may temporarily interrupt the communication between the pressure control valve and the suspension in response to a temporary pressure fall in the high pressure piping even though such pressure fall is insufficient to cause a reduction in the suspension pressure. Such pressure fall may be caused by various factors. For example, it may be caused by a momentary oscillatory behavior of the pressure in the high pressure piping caused by an oscillation or shock applied to the car body. Alternatively, it may be caused by a wheel or wheels dropping into a depth, which causes a rapid reduction in the suspension pressure and hence a pressure fall from the output port of the pressure control valve, thereby driving the spool rapidly in a direction to increase the degree of communication between the line pressure port and the output port, resulting in a temporary sharp fall of the pressure of the line pressure port or the high pressure piping by the line pressure port communicating with the output port, which temporarily assumes a low pressure, with an increased opening. When the pressure fluctuation of the high pressure piping is oscillatory and the pressure fall occurs repeatedly, the cut valve unit will oscillate between its open/closed condition. In the process when the cut valve unit changes from its open to its closed condition, the valve element may strike the opening edge located at the input port which is on the side of the pressure control valve/output port (located on the side of the suspension) under the resilience of the spring member, producing sounds of percussion or sounds resulting from vibrations of metals against metals. In addition, a pressure surge or oscillation may be produced at the output port of the pressure control valve, detracting from the smoothness of the pressure control.

SUMMARY OF THE INVENTION

It is a first object of the invention to suppress a fluctuation in the output pressure from the pressure control valve which may be caused by a pressure variation in the return path leading to the low pressure port of the pressure control valve.

It is a second object of the invention to prevent automatically a reduction in the suspension pressure in response to a pressure fall in the high pressure piping. A third object is to inhibit a temporary operation of the cut valve unit which is used to achieve the second object to interrupt a communication, which may be caused by a momentary or oscillatory pressure fall in the high pressure piping which is insufficient to cause any substantial reduction in the suspension pressure.

The first object is accomplished by providing a pressure control system according to a first embodiment of the invention comprising a pressure source (1) for supplying a fluid which is withdrawn from a reservoir (2) to a high pressure piping (6) under a high pressure which delivers a hydraulic fluid to a suspenion (100 fr) which is adapted to extend or shrink in response to a pressure supplied thereto; and a pressure control valve (80 fr) including a line pressure port (82) communicating with the high pressure piping (6), a low pressure port (85) communicating with a fluid return path (11) leading to the reservoir (2), an output port (84) for delivering a pressure to the suspension (100 fr), a target pressure space (88) communicating with the line pressure port (82) through an orifice (88 f), a spool (90) responsive to a pressure from the output port (84) applied to its one end to be driven in a direction to reduce a degree of communication between the line pressure port (82) and the output port (84) and to increase a degree of communication between the low pressure port (85) and the output port (84) and also responsive to a pressure from the target pressure space (88) applied to its other end to be driven in a direction to increase a degree of communication between the line pressure port (82) and the output port (84) and to reduce a degree of communication between the low pressure port (85) and the output port (84), a valve element (95) for defining a degree of communication between the target pressure space (88) and the fluid return path (11) leading to the reservoir (2), electrically energized drive means (96, 97, 98a, 98b) for driving the valve element (95) in a direction to increase/decrease the degree of communication, and an orifice (37) interposed in a flow path between the fluid return path (11) leading to the reservoir (2) and an operating space (32) for the valve element (95).

It is to be understood that reference characters appearing in parentheses designate corresponding parts appearing in the first embodiment to be described later in connection with the drawings.

In the pressure control valve (80 fr) described above, a movement of the spool (90) causes a relatively high pressure from the output port (84) to be discharged to the low pressure port (85), and such discharge takes place in the form of an oscillation which occurs with a relatively high frequency, which is then transmitted to the return path (11). However, the orifice (37) is interposed in a flow path between the return path (11) and the operating space (35) for the valve element (95), and is effective to suppress the pressure oscillation having a high frequency. In this manner, the transmission of such pressure to the operating space (35) for the valvement (95) is substantially blocked, and becomes attenuated in the return path (11). In other words, the pressure fluctuation in the operating space (35) for the valve element (95) which may be caused by the pressure fluctuation in the return path (11) will be substantially suppressed, thus drastically reducing the pressure fluctuation in the target pressure space (88) and substantially eliminating the pressure fluctuation in the output port (84).

When a pressure surge is applied to the output port of one of the pressure control valve (80 fr) as a wheel or wheels associated with the suspension becomes impacted by bumps, the orifice (37) in this pressure control valve acts to suppress the transmission of such pressure surge to the operating space (35) for the valve element (95), whereby any variation in the output pressure from the pressure control valve (80 fr) is substantially eliminated. In addition, if the pressure surge should be transmitted to other pressure control valves through the return path (11), these other pressure control valves also include orifices (37) which again substantially block the transmission of the pressure surge to the operating spaces (35) for their valve elements (95). Consequently, the application of a pressure surge to the output port (84) of a single pressure control valve which may be occasioned by one of the wheels being impacted by bumps and a consequent pressure surge to the return path (11) cannot ripple through to the remaining pressure control valves, with a consequence that the pressure control of the individual suspensions becomes stabilized and any pressure error of each suspension is reduced.

Thus, in the first embodiment of the invention, a fluctuation or an errorneous variation in the output pressure from the pressure control valve (80 fr) is suppressed, contributing to the stabilization of the pressure control of the respective suspensions and reducing any pressure error associated with these suspensions.

According to a second embodiment of the invention, a pressure control system which accomplishes the first object comprises a low pressure accumulator (190 fr) connected in a channel (89) between the target pressure space (88) of the pressure control valve (80 fr) and the fluid return path (11) leading to the reservoir (2). With this arrangement, a pressure fluctuation in the low pressure space which communicates with the target pressure space (88) is smoothed out by the low pressure accumulator (190 fr) connected in the channel between the target pressure space (88) and the return path (11) acting to accumulate the pressure by absorbing part of the pressure oil displaced in response to a pressure rise and by releasing the accumulated pressure oil in response to an increase/decrease in the suspension pressure caused by an upward or downward pressure surge as when a wheel or wheels are impacted up or drop into a depth, which is responded by the spool (90) displacing the pressure oil to the low pressure port (85), whereby its pressure rises or falls and the resulting pressure fluctuation is transmitted to the return path (11) at a location nearer the pressure control valve (80 fr). In this manner, a pressure fluctuation in the target pressure space (88) is suppressed or smoothed to reduce a pressure error thereof, in particular, a pressure error of the type which varies relatively rapidly and which tends to cause an upset in the suspension pressure control. As a consequence of this, an offset of the output pressure from the pressure control valve (80 fr) or the suspension pressure is diminished, contributing to stabilizing the attitude control of the car body.

In particular, a pressure fluctuation of the low pressure port (85) connected to the output port of the pressure control valve (80 fr) which results from the operation of the spool (90) in regulating the output pressure represents a direct output pressure error. Accordingly, in a preferred embodiment of the invention, the low pressure port (85) is also disposed in communication with the low pressure accumulator (190 fr).

A pressure control system according to the invention which accomplishes the second and the third object comprises a pressure source (1) for supplying a fluid under a high pressure to a high pressure piping (6) which delivers a hydraulic fluid to a suspension (100 fr) which is adapted to extend and shrink in response to a pressure supplied thereto; a pressure control valve (80 fr) for regulating the pressure from the piping (6) to a pressure which varies in accordance with an electrical energization thereof before it is supplied to the suspension (100 fr); and a cut valve unit (70 fr) including a pilot pressure space (72p) for receiving a pressure from the piping (6), an input port (72) for receiving a regulated pressure from the pressure control valve (100 fr), an output port (75) communicating with the suspension (100 fr), a valve element (78) driven by a pressure from the pilot pressure space (72p) to establish a communication between the input port (73) and the output port (75), a spring member (79) for urging the valve element (78) in a direction to interrupt the communication between the input port (73) and the output port (75), and an orifice (72f) interposed between the pilot pressure space (72p) and the piping (6).

With this arrangement, when the pressure of the piping (6) reduces below a pressure which is balanced with the resilience of the spring member (79), the cut valve unit (70 fr) automatically interrupts the connection between the pressure control valve (80 fr) and the suspension (100 fr), thus automatically preventing a pressure release from the suspension (100 fr) to the pressure control vavle (80 fr).

In the event the pressure of the piping (6) is temporarily depressed or depressed in an oscillatory manner to a degree which substantially prevents a reduction in the suspension pressure, such depression in the pressure is prevented from being rippled to the pilot pressure space (72p) by the orifice (72f). In other words, the orifice (72f) attenuates a temporary pressure wave from the piping (6) to the pilot pressure space (72p), whereby sounds of percussion or metal vibrations which may be otherwise produced by the valve element (78) of the cut valve unit (70 fr) can be reduced or eliminated while simultaneously substantially eliminating any pressure surge or pressure oscillation applied to the output port (84) of the pressure control valve (80 fr).

Other objects and features of the invention will become apparent from the following description of several embodiments thereof with reference to the drawings.

BRIEF DESCRIPTION OF THE DRAWINGS

FIG. 2 is a longitudinal section, to an enlarged scale, of a suspension 100 fr shown in FIG. 1a;

FIG. 3 is a longitudinal section, to an enlarged scale, of a pressure control valve 80 fr shown in FIG. 1a;

FIG. 4 is a longitudinal section, to an enlarged scale, of a cut valve 70 fr shown in FIG. 1a;

FIG. 5 is a longitudinal section, to an enlarged scale, of a relief valve 60 fr shown in FIG. 1a;

FIG. 6 is a longitudinal section, to an enlarged scale, of a main check valve 50 shown in FIG. 1a;

FIG. 9 is a longitudinal section, to an enlarged scale, of a pressure control valve 80 fr shown in FIG. 8a.

DESCRIPTION OF PREFERRED EMBODIMENTS

FIRST EMBODIMENT

Figure 1A:
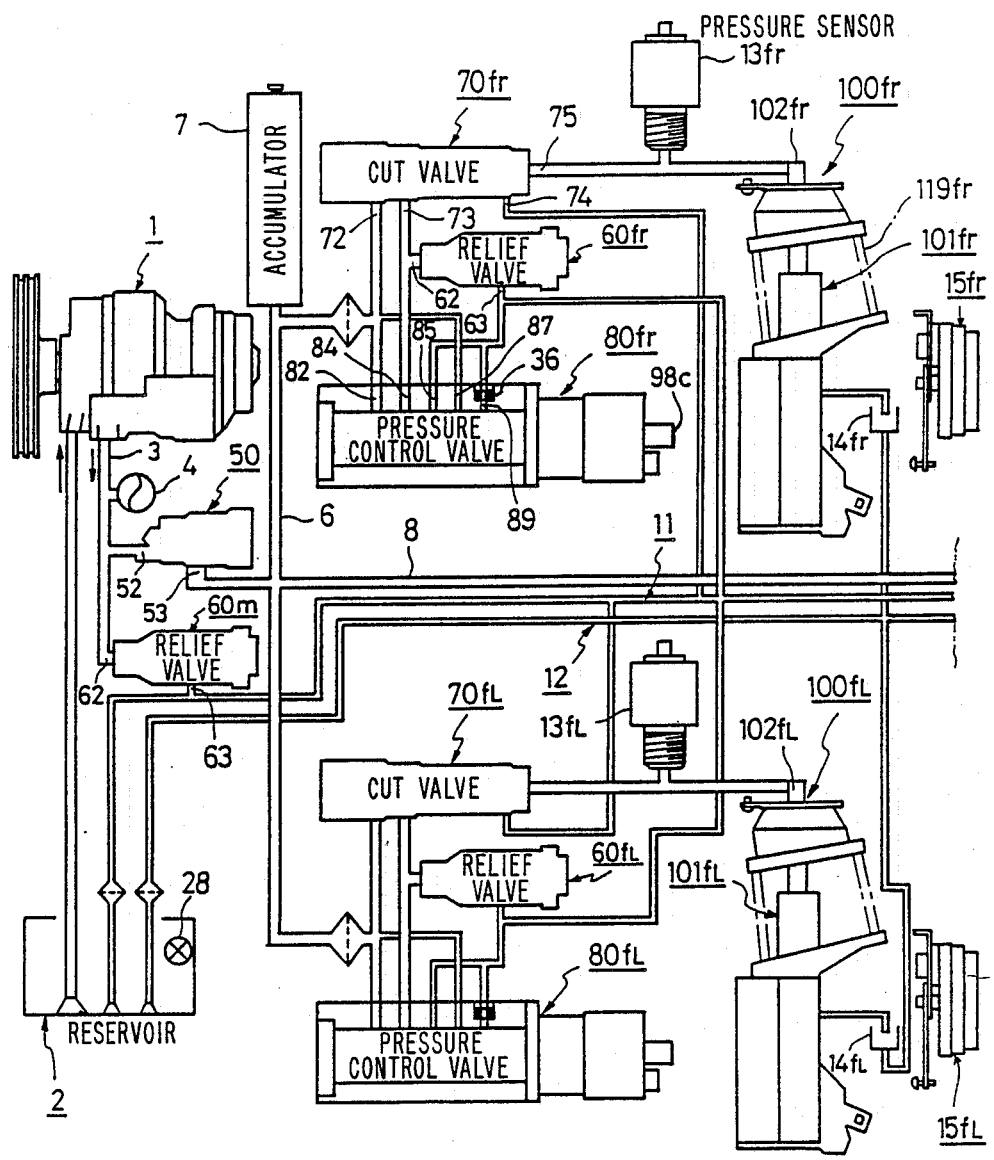
FIGS. 1a and 1b are block diagrams which, when combined together, illustrate a suspension pressure feeding system according to a first embodiment of the invention.
Figure 1B:
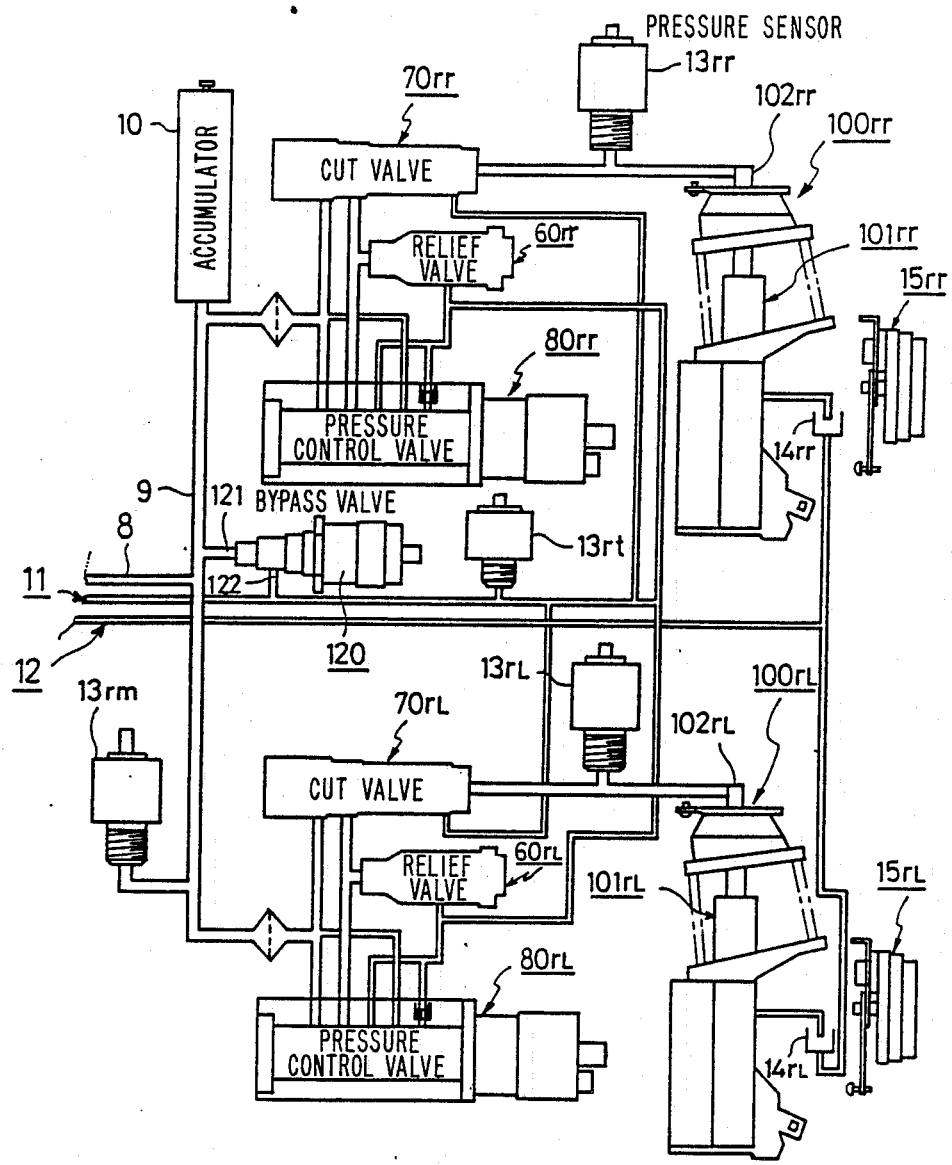

FIGS. 1a and 1b show a mechanical arrangement of an apparatus which supports a carrosserie or car body. An oil pressure pump 1, which is of radial type, is disposed within an engine room, and is driven for rotation by an onboard engine, not shown, thus drawing an oil from a reservoir 2 and discharging a given flow rate of oil to a high pressure port 3 at a rotational speed equal to or greater than a given value.

High pressure port 3 of the radial pump is connected to an accumulator 4 which serves suppressing pulsations, to a main check valve 50 and to a relief valve 60m. A high pressure oil from the port 3 is fed to a high pressure piping 8 through the valve 50. The check valve 50 blocks a reverse flow of the oil from the piping 8 to the port 3 whenever the port 3 assumes a lower pressure than the piping 8. The relief valve 60m drains the port 3 to a reservoir return piping 11, which represents one of return oil paths to the reservoir 2, when the pressure of the port 3 assumes a greater than a given value, thus maintaining the pressure of the port 3 substantially at a given pressure.

The high pressure feed piping 8 communicates with a front wheel high pressure feed piping 6 which feeds a high pressure to front wheel suspensions 100 fL, 100 fr, and a rear wheel high pressure feed piping 9 which feeds high pressure to rear wheel suspensions 100 rL, 100 rr. The piping 6 communicates with an accumulator 7 for the front wheels while the piping 9 communicates with an accumulator 10 for the rear wheels.

The piping 6 is also connected to a pressure control valve 80 fr through an oil filter, and the valve 80 fr is effective to regulate or reduce the pressure from the piping 6, which will be hereafter referred to as a front wheel line pressure, to a required pressure before supplying it to a cut valve 70 fr and a relief valve 60 fr. The required pressure is substantially proportional to a current level which is used to energize an electrical coil of the valve 80 fr and represents a suspension sustain pressure.

When the pressure of the piping 6 or the front wheel line pressure is below a given value, the cut valve 70 fr interrupts a communication between the output port 84 (to the suspension) of the pressure control valve 80 fr and a hollow piston rod 102 fr associated with a shock absorber 101 fr of the suspenison 100 fr, thus preventing the pressure of the piston rod 102 fr from being released to the pressure control valve 80 fr. When the front rear line pressure remains at or above the given value, the cut valve 70 fr allows the output pressure from the pressure control valve 80 fr to be directly fed to the piston rod 102 fr.

The relief valve 60 fr restricts the internal pressure of the shock absorber 101 fr at or below an upper limit. Specifically, when the suspension sustain pressure from the output port 84 of the pressure control valve 80 fr exceeds a given high pressure, the output port 84 is drained to the reservoir return path or piping 11, thus maintaining the output port of the valve 80 fr substantially at or below the given high pressure. The relief valve 60 fr is also effective to provide a buffering action upon the transmission to the pressure control valve 80 fr of any shocking rise in the internal pressure of the shock absorber 101 fr, as when a front, right wheel of the vehicle strikes against a bump on the road. In response to such rise, the internal pressure of the shock absorber 101 fr is drained to the reservoir return path 11 through the piston rod 100 fr and the cut valve.

The suspension 100 fr essentially comprises the shock absorber 101 fr and a coiled suspension spring 119 fr, and operates to maintain a car body at an elevation relative to the front, right wheel, which corresponds to the pressure supplied to the shock absorber 101 fr from the output port 84 of the pressure control valve 80 fr through the piston rod 102 fr, or a pressure which is regulated by the pressure control valve 80 fr or the suspension sustain pressure.

The sustain pressure fed to the shock absorber 101 fr is detected by a pressure sensor 13 fr, which produces an analog signal representing a detected sustain pressure. A vehicle elevation sensor 15 fr is mounted on the car body adjacent to the suspension 100 fr, and includes a rotor connected to a link which is coupled to the front, right wheel. In this manner, the sensor 15 fr produces a digital data representing the elevation of a car body with respect to the front, right wheel.

In a similar manner, a suspension 100 fL associated with a front, left wheel is equipped with a pressure control valve 80 fL, a cut valve 70 fL, a relief valve 60 fL, a vehicle elevation sensor 50 fL, and a pressure sensor 13 fL. The pressure control valve 80 fL is connected to the front wheel high pressure feed piping 6, thus feeding a required pressure to the piston rod 102 fL of the shock absorber 101 fL of the suspension 100 fL.

Furthermore, a suspension 100 rr associated with a rear, right wheel is equipped with a pressure control valve 80 rr, a cut valve 70 rr, a relief valve 60 rr, a vehicle elevation sensor 15 rr and a pressure sensor 13 rr. The valve 80 rr is connected to the rear wheel high pressure feed piping 9, feeding a required pressure to the piston rod 102 rr of a shock absorber 101 rr of the suspension 100 rr.

Finally, a suspenion 100 rL associated with a rear, left wheel is equipped with a pressure control valve 80 rL, a cut valve 70 rL, a relief valve 60 rL, a vehicle elevation sensor 15 rL and a pressure sensor 13 rL. The pressure control valve 80 rL is connected to the rear wheel high pressure feed piping 9, feeding a required pressure to the piston rod 102 rL of a shock absorber 101 rL of the suspension 100 rL.

In this embodiment, an engine is mounted on the front wheel side, and accordingly the pump 1 is also mounted on the front wheel side or in the engine room, whereby the length of pipings from the pump 1 to the rear wheel suspensions 100 rr, 100 rL is greater than the length of pipings from the pump 1 to the front wheel suspensions 100 fr, 100 fL. Accordingly, a pressure drop caused by the piping path is greater for the rear wheels, and if an oil leakage occurs in the piping, the pressure drop will be greatest for the rear wheels. Accordingly, a line pressure detecting sensor 13rm is connected to the rear wheel high pressure feed piping 9. On the other hand, the pressure of the reservoir return path 11 will be lowest at its end located nearer the reservoir 2, and will tend to increase in a direction away from the reservoir 2. Accordingly, the pressure of the reservoir return path 11 is also detected by a pressure sensor 13 rr which is located toward the rear wheel.

The piping 9 is connected to a bypass valve 120, which is effective to regulate a pressure in the high pressure feed piping 8 to a value which corresponds to a current level used to energize an electrical coil of the valve 120, thus obtaining a required line pressure. When an ignition switch is opened to stop the operation of the engine and hence the pump 1, the line pressure is reduced substantially to zero or drained through the reservoir return path 11 to the atmospheric pressure which prevails in the reservoir 2, thus reducing the loading upon the engine or pump when restarting. The reduction in the line pressure turns the cut valves 70 fr, 70 fL, 70 rr, 70 rL off, thus preventing a pressure release from the shock absorbers.

Figure 2:
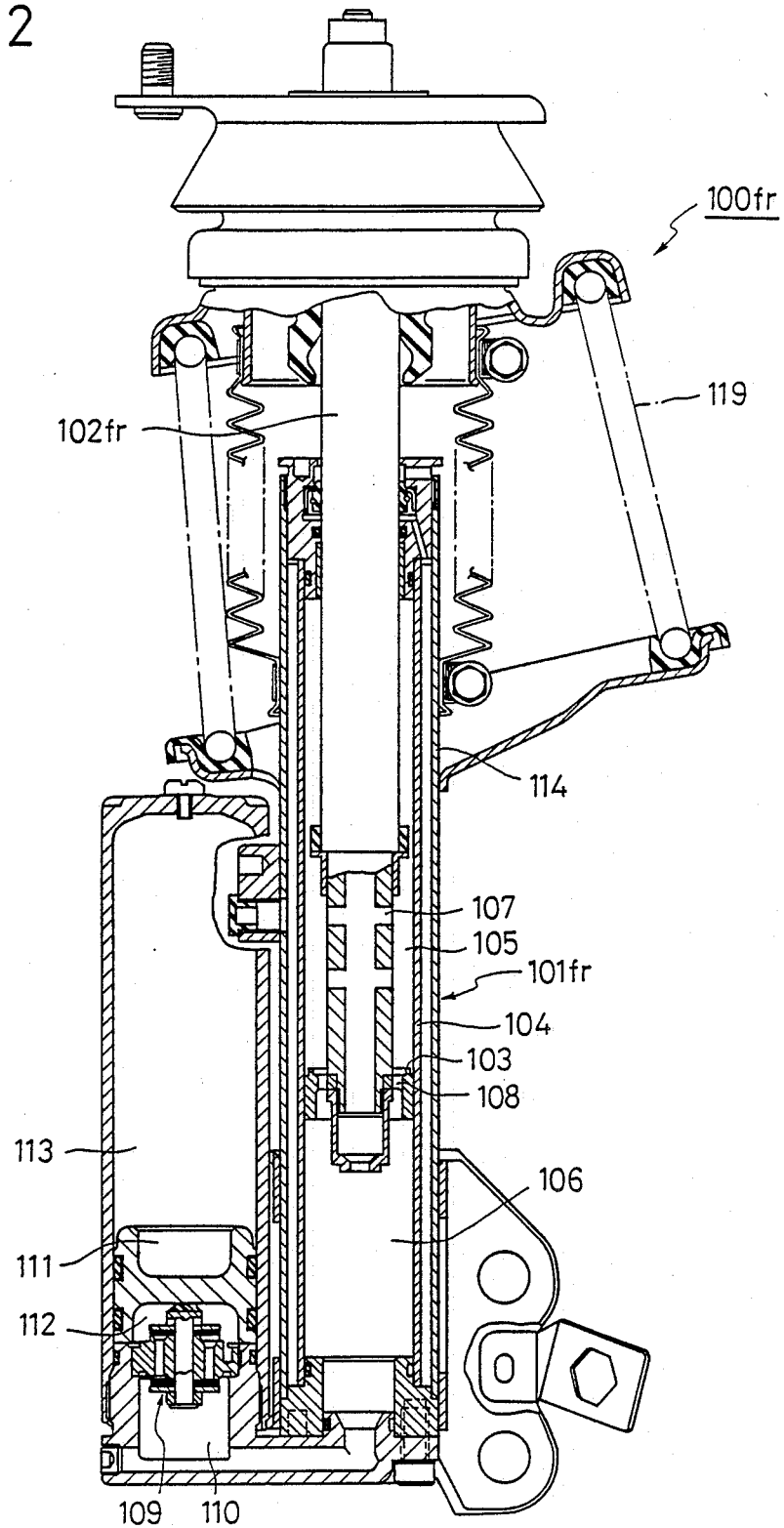

FIG. 2 shows a longitudinal section, to an enlarged scale, of the suspension 100 fr. A piston 103 is fixedly mounted on the piston rod 102fr of the shock absorber 101 fr, and extends through an inner sleeve 104 to divide its interior into an upper chamber 105 and a lower chamber 106. An oil pump pressure which represents the suspension sustain pressure is fed to the piston rod 102 fr from the output port of the cut valve 70 fr, which pressure is passed through a side opening 107 in the piston rod 102 fr to be applied to the upper chamber 105 disposed inside the inner sleeve 104, and thence passed through a vertical through-opening 108 formed in the piston rod 103 to be applied to lower chamber 106. A sustain pressure which is proportional to the product of the pressure applied to the lower chamber 106 and cross-sectional area (the square of the rod radius multiplied by $\pi$) of the piston rod 102 $fr$ is applied to the piston rod 102 $fr$.

The lower chamber 106 communicates with a lower space 110 in an attenuator valve unit 109, which has an upper space that is divided by a piston 111 into a lower chamber 112 and an upper chamber 113. An oil from the lower space 110 passes through the valve unit 109 into the lower chamber 112 while a high pressure gas is confined in the upper chamber 113.

If the piston rod 102 $fr$ plunges rapidly downward into the inner sleeve 104 as a result of a bumping reaction of the front, right wheel, the internal pressure of the inner sleeve 104 increases rapidly, and similarly, the pressure in the lower space 110 tends to increase above the pressure in the lower pressure 112 rapidly. At this time, oil flows from the lower space 110 into the lower chamber 112 through a check valve which permits a flow of the oil from the lower space 110 to the lower chamber 112 above a given pressure differential across the valve unit 109, but which blocks a passage of the oil in the opposite direction, whereby the piston 111 moves up, thus buffering the transmission of upward impact applied from the wheel to the piston rod 102 $fr$. In this manner, the transmission of bumping effect of the wheel to the car body is buffered.

If the piston rod 102 $fr$ tends to be withdrawn upwardly from within the inner sleeve 104 as the front, right wheel goes down rapidly, the internal pressure of the inner sleeve 104 reduces rapidly, again causing the pressure of the lower space 110 to be rapidly reduced below the pressure of the lower chamber 112. At this time, oil flows from the lower chamber 112 to the lower space 110 through a check valve which permits a flow of the oil from the lower chamber 112 to the lower space 110 above a given pressure differential across the valve unit 109, but which blocks a passage of the oil in the opposite direction, whereby the piston 111 moves down, buffering the transmission of downward impact applied from the wheel to the piston rod 102 $fr$. In this manner, the transmission of impact applied to the wheel or falling effect to the car body is buffered.

As the pressure applied to the shock absorber 101fr increases in order to increase the vehicle elevation, the pressure in the lower chamber 112 rises, which in turn causes the piston 111 to be raised, allowing the latter to assume a position which corresponds to a loading upon the car body.

When there is no vertical movement of the piston rod 102 $fr$ relative to the inner sleeve 104 as during a parking condition, a seal between the inner sleeve 104 and the piston rod 102 $fr$ prevents any substantial oil leakage from the inner sleeve 104 to an outer sleeve 114. However, it is desirable that such seal exhibits a sealing characteristic which permits a very limited amount of oil leakage during the vertical movement of the piston rod 102 $fr$ in order to reduce a resistance presented to such movement of the rod 102 $fr$. Any oil leaking to the outer sleeve 114 is returned to the reservoir 2 through a drain 14 $fr$ (FIG. 1a) which is open to the atmosphere and a drain return piping 12 (FIG. 1a), which represents a second return path. The reservoir 2 is equipped with a level sensor 28 (FIG. 1a), which produces an oil shortage signal when the oil level within the reservoir 2 is below a lower limit.

It should be understood that other suspensions 100 $fL$, 100 $rr$ and 100 $rL$ are constructed in substantially the same manner as the suspension 100 $fr$ mentioned above.

Figure 3:
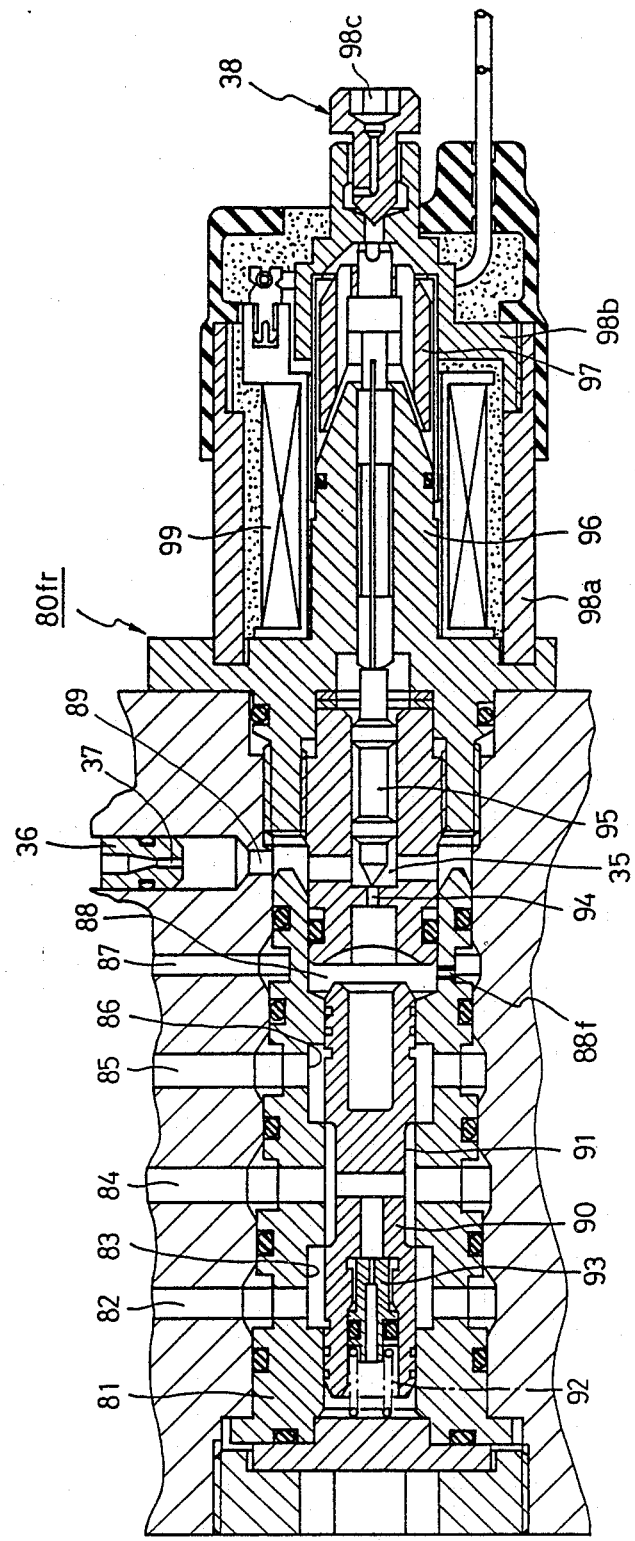

FIG. 3 shows a longitudinal section, to an enlarged scale, of the pressure control valve 80 $fr$. It includes a sleeve 81, which is centrally formed with a spool receiving opening, the inner surface of which is formed with an annular groove 83 communicating with a line pressure port 82 and another annular groove 86 communicating with a low pressure port 85. An output port 84 opens into the sleeve at a location intermediate the both annular grooves 83, 86. A spool 90 is inserted into the spool receiving opening, and intermediate its length, its peripheral surface is formed with an annular groove 91 having a width which corresponds to the distance between a right edge of the groove 83 and a left edge of the groove 86. The left end of the spool 90 is formed with a valve receiving opening, which communicates with the groove 91, and into which a valve element 93 is inserted and held in place by a coiled compression spring 92. The valve element 93 is centrally formed with an orifice extending therethrough, which provides a communication between the space in which the groove 91 and hence the output port 84 is located and the space in which the valve element 93 and the spring 92 are received. Accordingly, at its left end, the spool 90 is subject to a pressure from the output port 84 or a regulated pressure which is applied to the suspenion 100 $fr$, whereby it is urged to the right. In the event a pressure from the output port 84 increases in an impulse manner, the valve element 93 is driven to the left against the resilience of the spring 92, creating a buffering space to the right of the valve element 93. Accordingly, when the pressure from the output port 94 rises in an impulse manner, such pressure rise is not immediately applied to the left end face of the spool 90, and thus the valve element 93 provides a buffering action upon a movement of the spool 90 to the right in response to an impulse-like pressure rise, or pressure surge from the output port 84. Conversely, it also exerts a buffering action upon a movement of the spool 90 to the left in response to an impulse-like pressure fall from the output port 84.

The right end face of the spool 90 is subject to a pressure from a target pressure space 88 communicating with a high pressure port 87, which pressure is supplied through an orifice 88$f$, whereby the spool 90 is urged to the left. A line pressure is fed to the high pressure port 87 while the target pressure space 88 communicates with the low pressure port 89 through the channel 94, the valve element operating space 35 and the orifice 37 of an orifice member 36, with the channel area of the channel 94 being determined by a needle valve 95. When the needle valve 95 closes the channel 94, the target pressure space 88 which communicates with the high pressure port 87 through the orifice 88$f$ assumes the line pressure of the port 87, whereby the spool 90 is driven to the left, allowing the groove 91 in the spool 90 to communicate with the groove 83 or the line pressure port 82, thus causing the pressure of the port 91 or output port 84 to rise which is then transmitted to the left of the valve element 93, thus imparting a rightward driving force to the left end of the spool 90. When the needle valve 95 is located to leave the channel 94 fully open, the pressure from the space 88 will be substantially reduced below the line pressure from the high pressure port 87 because of the restriction presented by the orifice 88$f$. Accordingly the spool 90 moves to the right, allowing the goove 91 in the spool 90 to communicate with the groove 86 or the low pressure port 85, reducing the pressure in the port 91 or the output port 84. Such pressure is transmitted to the left of the valve element 93, thus reducing the rightward driving force which is applied to the left end of the spool 90. In this manner, the spool 90 assumes a position where the pressure from the target pressure space 80 is balanced with the pressure from the output port 84. Stated differently, a pressure which is substantially proportional to the pressure from the target pressure space 88 appears at the output port 84.

The pressure in the target pressure space 88 is determined by the position of the needle valve 95, which is in turn substantially in inverse proportion to the distance of the needle valve 95 from the channel 94, and hence there appears at the output port 84 a pressure which is substantially inversely proportional to the distance of the needle valve 95.

A stationary core 96 of magnetizable material is shaped to allow the needle valve 95 to extend therethrough, and has a right end which is in the form of truncated cone, which is opposed by a conical end face of a plunger 97, also formed of a magnetizable material, which defines an opening having a closed bottom. The needle valve 95 is secured to the plunger 97. The core 96 and the plunger 97 extend into a bobbin which carries an electrical coil 99 thereon.

When the coil 99 is energized, there is established a loop for a magnetic flux comprising the core 96, a yoke of magnetizable material 98a, an end plate of a magnetizable material 98b and the plunger 97 and then back to the core 96. The plunger 97 is attracted toward the core 96 and thus moves to the left, bringing the needle valve 95 closer to the channel 94 or reducing the distance mentioned above. It will be noted that the left end of the needle valve 95 is subject to a pressure from the target pressure space 88 which acts to drive it to the right while the right end of the needle valve 95 is subject to the atmospheric pressure through a low pressure port 98c which is open to the atmosphere, so that the needle valve 95 will be driven to the right by the pressure from the target pressure space 88 with a force which depends on the magnitude of such pressure (it will be noted that this corresponds to the position of the needle valve 95). As a consequence, the needle valve 95 is spaced from the channel 94 by a distance which is virtually inversely proportional to the current level which is used to energize the coil 99. One of the core and the plunger is shaped as a truncated cone while the other is shaped as a complementary conical opening in order to achieve a linear relationship between the current level and distance. As a consequence of such arrangement, there appears an output at the output port 84 which is substantially proportional to the current level used to energize the coil 99. The pressure control valve 80 fr delivers a pressure at the output port 84 which is proportional to the current level within a given range.

As the spool 90 moves, the relatively high pressure from the output port 84 is discharged into the low pressure port 85. This discharge takes place in the form of a repeated oscillation having a relatively high frequency, which oscillation is transmitted to the return path 11. However, the orifice 37 is interposed in the channel between the return path 11 and the operating space 35 for the needle valve 95, and operates to suppress the transmission of such pressure oscillation having a high frequency. As a consequence, the transmission of such pressure to the operating space 35 is substantially blocked and is attenuated in the return path 11. In other words, a pressure fluctuation of the operating space 35 which may be caused by a pressure oscillation in the return path 11 is substantially reduced, thus substantially reducing the pressure fluctuation in the target pressure space 88 and also substantially eliminating a pressure fluctuation in the output port 84.

When a pressure surge is applied to the output port 84 of the one of the pressure control valves as when a wheel or wheels associated with the suspension are impacted by bumps to cause the spool 90 to be driven to the right, which results in a communication between the output port 84 and the low pressure port 85 to allow the pressure surge to be applied to the return path 11, the transmission of such pressure surge to the operating space 35 for the needle valve 95 is suppressed by the orifice 37 of the pressure control valve, substantially eliminating a variation in the output pressure from the pressure control valve. In addition, if such pressure surge should be transmitted through the return path 11 to the remaining pressure control valves, the orifices (37) of these other pressure control valves are also operative to block the transmission of the pressure surge to the operating space 88 thereof substantially. In other words, the application of a pressure surge to the output port 85 of one of the pressure control valves or the resulting temporary pressure rise of the return path 11 which may be occasioned by one of the wheels being impacted by bumps is prevented from being rippled through to the remaining pressure control valves, with consequence that the pressure control of the individual suspensions are stabilized and the pressure errors of the individual suspensions are reduced.

It is to be noted that the low pressure port 98c is open to the atmosphere.

Figure 4:
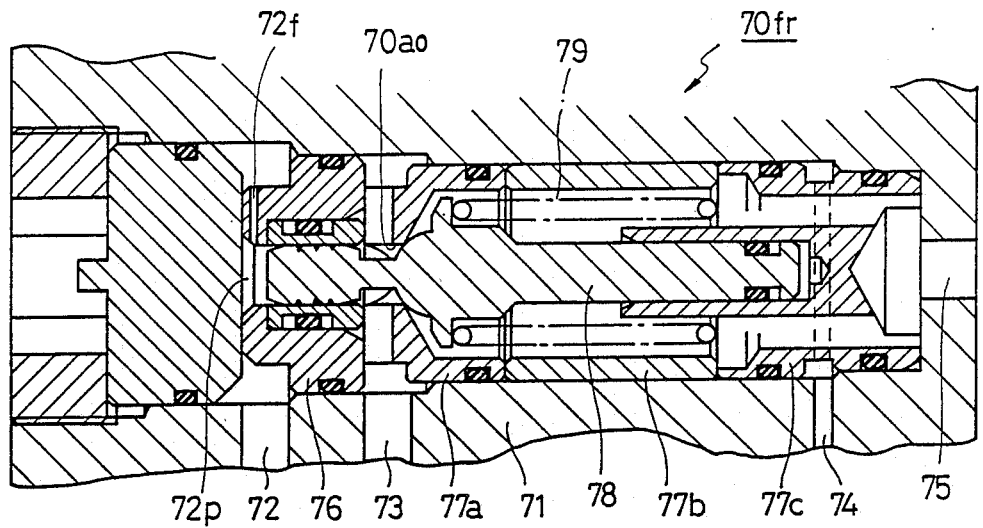

FIG. 4 shows a longitudinal section of the cut valve 70 fr to an enlarged scale. It includes a valve body 71 formed with a valve receiving bore which communicates with a line pressure port 72, a regulation input port 73, a drain port 74 and an output port 75. An annular first guide 76 provides a partition between the ports 72 and 73, and three cylindrical guides 77a, 77b and 77c provide a partition between the ports 73 and 75. The drain port 74 communicates with an annular groove formed in the outer periphery of the second guide 77c, thus returning any oil which leaks to the outer periphery of these second guides 77a to 77c to the return path 11.

A spool 78 is urged by a coiled compression spring 79 to the left to extend through first and second guides 76, 77a to 77c, and the line pressure is applied to the pilot pressure space 72p located at the left end face of the spool 78 through the orifice 72f and the line pressure port 72. A guide hole formed in a central plateau of the second guide 77c in which the right end of the spool 78 is disposed communicates with the return path 11 through an annular groove formed in the outer periphery of this guide and through the drain hole 74. When the line pressure is below a given low value, the spool 78 is driven to its leftmost position under the resilience of the spring 79, whereby a communication between the ports 75 and 73 is interrupted as a result of the spool 78 fully closing the internal opening of the second guide 77a. When the line pressure reaches a given low pressure or exceeds it, or when the pressure in the pilot pressure space 72p becomes equal to or greater than the given low pressure, this pressure begins to drive the spool 79 to the right against the resilience of the spring 79, and the spool reaches its rightmost position where it is fully open at a pressure greater than the given low pressure. Thus, the spool 78 lies to the right of an inner opening 77ao of the second guide 77a, and the regulated pressure input port 73 communicates with the output port 75. Accordingly, when the line pressure at the port 72 rises to the given low pressure, the cut valve 70 fr begins to establish a communication between the regulated pressure input port 73 or the regulated pressure output from the valve 80fr and the output port 75 or the shock absorber 101fr As the line pressure further increases, the communication between the input port 73 and the output port 75 reaches its maximum. An opposite procedure takes place when the line pressure decreases, and when it reduces below the given low pressure, the communication between the output port 75 and the input port 73 is completely interrupted.

As mentioned above, when the pressure in the front wheel, high pressure feed piping 6 reduces below a pressure level which is balanced with the resilience of the spring 79, the cut valve 70 fr automatically interrupts the communication between the pressure control valve 80 fr and the suspension 100 fr, thus automatically preventing a pressure release from the suspension 100 fr to the pressure control valve 80 fr.

If the pressure of the front wheel, high pressure feed piping 6 is temporarily depressed or depressed in a oscillatory manner to a degree which does not cause any substantial reduction in the suspension pressure, such depression in the pressure is prevented from being rippled through to the pilot pressure space 72p by the orifice 72f. Thus, the orifice 72f attenuates the temporary pressure wave applied from the piping 6 to the pilot pressure space 72p, and hence sounds of percussion or metal oscillations which may be caused by an abutment of the spool 78 of the cut valve 70 fr against the edge of the opening 77 ao are reduced or eliminated, and the transmission of the pressure surge or pressure oscillation to the output port 84 of the pressure control valve 80 fr is substantially eliminated.

Figure 5:
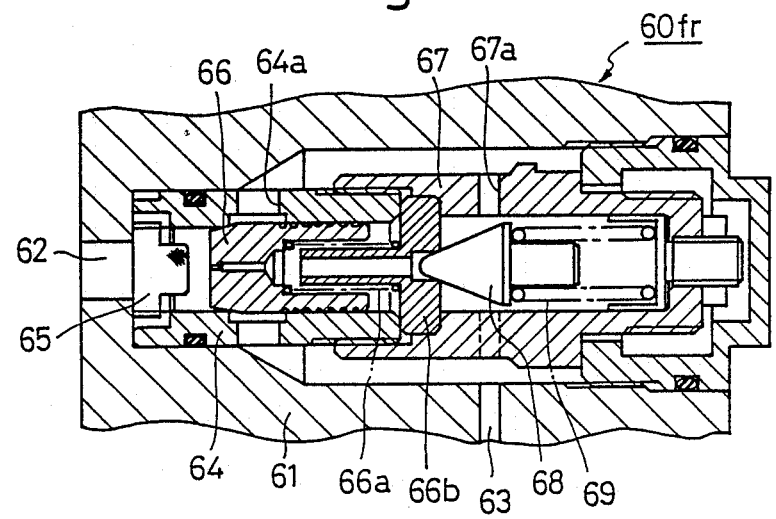

FIG. 5 shows the relief valve 60 fr in an enlarged longitudinal section. It includes a valve body 61 formed with a valve receiving bore, into which an input port 62 and a low pressure port 63 open. The valve receiving opening receives a first guide 64 and a second guide 67, both of which are cylindrical in configuration, and the input port 62 communicates with the inner space of the first guide 64 through a filter 65. A valve element 66 having a centrally disposed orifice is inserted into the first guide 64, and the valve element 66 is urged to the left by a coiled compression spring 66a. The space in the first guide 64 in which the valve element 66 and the spring 66a are received communicates with the input port 62 through the orifice in the valve element 66, and also communicates with the internal space of the second guide 67 through an opening formed in a spring abutment 66b. A conical valve element 68 is urged to the left by a coiled compression spring 69 to close the opening in the spring abutment 66b. When a control pressure from the input port 62 is below a given high pressure, a space in which the spring 66a is received and which communicates with the input port 62 through the orifice in the valve element 66 assumes a pressure which is less in magnitude than the resilience of the spring 69, whereby the valve element 68 closes the central opening in the valve seat 66b, as shown in FIG. 5. Thus, the output port 62 is cut off from the internal space of the second guide 67 which communicates with the low pressure port 63 through an opening 67a. Thus, the output port 62 is cut off from the low pressure port 63.

When the control pressure to the input port 62 rises to the given high pressure, the pressure which is applied to the central opening in the valve seat 66b through the orifice in the valve element 66 is effective to initiate driving the valve element 68 to the right, and when the pressure from the port 62 further increases, the valve element 68 will be driven to its rightmost position, where the pressure from the input port 62 will be discharged into the low pressure port 63, thus suppressing the control pressure around or less than the given high pressure.

When a high pressure surge is applied to the input port 62, the valve element 66 is driven to the right, whereby the input port 62 communicates with the space in the body 61 which receives the valve through a lateral opening 64a formed in the first guide 64 and thence to the low pressure port 63 having an increased channel area, thus providing a buffering action upon a rapid pressure surge applied from the input port 62.

Figure 6:
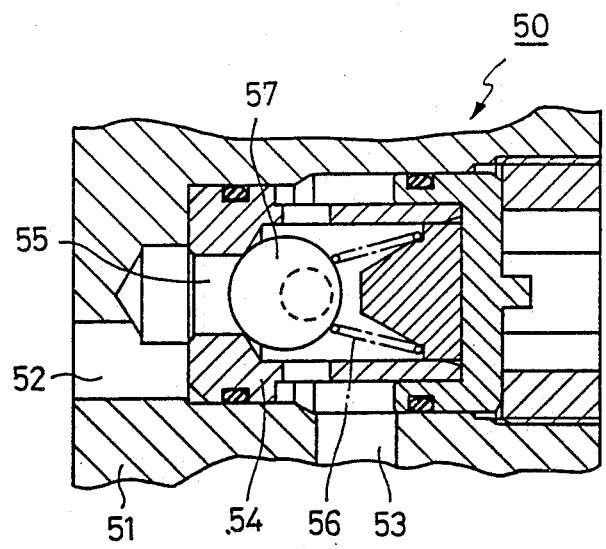

FIG. 6 is an enlarged longitudinal section of the main check valve 50. It includes a valve body 51 formed with a valve receiving bore, which communicates with an input port 52 and an output port 53. A cylindrical valve seat 54 having a closed bottom is received in the bore, and is formed with a channel opening 55, which is usually closed by a ball valve 57 as urged by a coiled compression spring 56. However, when the pressure of the input port 52 is higher than the pressure of the output port 53, the ball valve 57 is pushed back to the right by the pressure from the input port 52, thus opening the channel opening 55 to allow an oil flow in a direction from the input port 52 to the output port 53. However, when the output port 53 assumes a pressure greater than that of the input port 52, the channel opening is closed by the ball valve 57, thus blocking a reverse oil flow.

Figure 7:
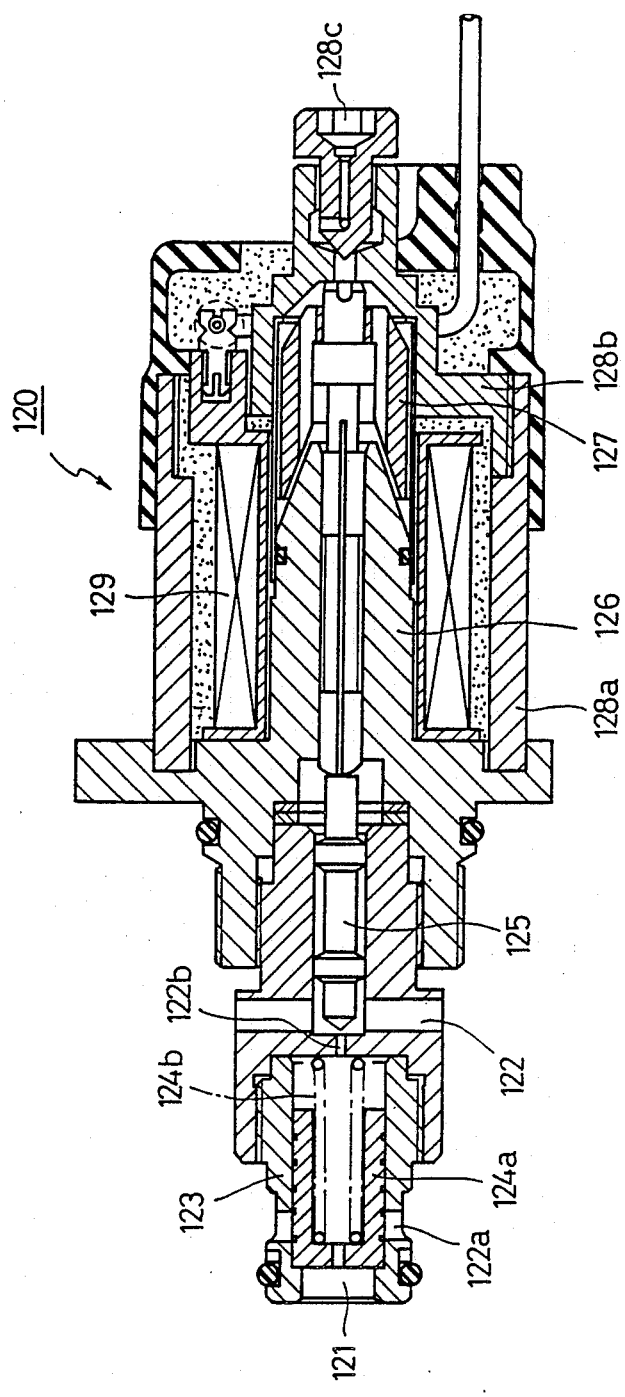
FIG. 7 is a longitudinal section, to an enlarged scale, of a bypass valve 120 shown in FIG. 1b.

FIG. 7 shows a bypass valve 120 in an enlarged longitudinal section. It includes a input port 121 which communicates with the internal space of a first guide 123, in which a valve element 124a is received and is normally urged to the left by a coiled compression spring 124b. The valve element 124a is centrally formed with an orifice in its left end face, through which the input port 121 communicates with the internal space of the first guide 123. This space communicates with a low pressure port 122 through a channel 122b, which is open or closed by a needle valve 125.

Solenoid assembly comprising components including the needle valve 125 and an electrical coil 129 has the same construction and the same size as the solenoid assembly shown in FIG. 3 including the needle valve 95 and the electrical coil 99 so as to be used in common for the pressure control valve and the bypass valve. It is designed so that the spacing of the needle valve 125 from the orifice 122b is substantially in inverse proportion to the current level which passes through the coil 129. The channel opening which the orifice 122b exhibits is in inverse proportion to the spacing, and hence the flow rate of the oil which passes from the input port 121 through the orifice of the valve element 124a, the internal space of the first guide 123 and through the orifice 122b to the low pressure port 112 is proportional to the pressure differential across the orifice formed in the left end face of the valve element 124a.

As a consequence, the pressure of the input port 121 will be substantially proportional to the current level which passes through the coil 129. The bypass valve 120 operates to provide a line pressure at the input port 121 which is proportional to the current level in a given range. When an ignition switch is off and accordingly the engine as well as the pump 1 cease to operate, the coil 129 is deenergized, whereby the needle valve 125 moves to its rightmost position, and the input port 121 or its line pressure assumes a low value which is near the return pressure.

When a high pressure surge is applied to the input port 121, the valve element 124a is driven to the right, whereby the low pressure port 122a communicating with the low pressure port 122 communicates with the input port 121. Since the low pressure port 122a has a relatively large opening, the pressure surge applied to the input port 121 is immediately discharged through the low pressure port 122a.

The relief valve 60m is constructed in the same manner as the relief valve 60 fr mentioned above, but employs a coiled compression spring (69) having slightly less resilience for urging a conical valve element (68 shown in FIG. 5). Accordingly, an output port (62) is cut off from a low pressure port (63) when a pressure from an input port (62) or a pressure at the high pressure port 3 is below a given high pressure which is slightly less than a pressure at which the relief valve 60 fr discharges the pressure at its input port 62 to the low pressure port 63. When the input port (62) assumes a pressure which is equal to or greater than the given high pressure, a valve element (68) is driven to its rightmost position. In this manner, the pressure from the input port (62) is discharged to the low pressure port (63), thus suppressing the pressure at the high pressure port 3 at or below the given high pressure.

In the apparatus for supporting a carrosserie as shown in FIGS. 1a and 1b, the main check valve 50 supplies oil from the high pressure port 3 to the high pressure piping 8, but blocks a reverse flow from the piping 8 to the port 3. The relief valve 60m suppresses the pressure at the high pressure port 3 or the high pressure piping 8 at or below a given high pressure, and in the event a high pressure surge is applied to the port 3, it releases such surge to the return path 11, thus buffering the transmission of a pressure surge to the piping 8.

The bypass valve 120 controls the pressure of the rear wheel high pressure feed piping 9 substantially linearly in a given range, and maintains the pressure of the piping 9 at a given value during a steady-state operation. The constant pressure control takes place by controlling the current level of the bypass valve 120 with reference to a pressure detected by the pressure sensor 13 rm. In the event a high pressure surge is applied to the rear wheel suspension, the valve releases it to the return path 11, thus buffering its transmission to the piping 8. When the ignition switch is open, and the engine as well as the pump 1 cease to operate, the energization is interrupted, whereby the piping 9 is made to communicate with the return path 11, thus decompressing.

Pressure control valves 80 fr, 80 fL, 80 rr, 80 rL deliver the required sustain pressure to output ports (84) by controlling the current level of the electrical coil (99) so that the required sustain pressure is applied to the suspension through the suspension pressure control. The transmission of a pressure surge to the suspension is buffered, thus suppressing a hunting of the pressure controlling spool (91), thus allowing the pressure applied to the suspension to be stabilized.

Cut valves 70 fr, 70 fL, 70 rr and 70 rL interrupt the suspension pressure feeding line between the output port 84 of the pressure control valve and the suspension to prevent the pressure from being released from the suspension when the line pressure (front wheel high pressure feed piping 6 or the rear wheel high pressure feed piping 9) is below a given low pressure, and fully opens the feed line whenever the line pressure is equal to or greater than the given low pressure. In this manner, the suspension pressure is automatically prevented from going abnormally low value when the line pressure is low.

Relief valves 60 fr, 60 fL, 60 rr, 60 rL limit the pressure of the suspension feed line between the output port 84 of the pressure control valve and the suspension or principally the suspension pressure to less than an upper limit so that any high pressure surge applied to the feed line or the suspension as when the vehicle is bumped or a load of high mass is thrown onto the vehicle may be released to the return path, thus buffering the impact upon the suspension and enhancing the durability of the feed line and its connected mechanical elements.

SECOND EMBODIMENT

Figure 8A:
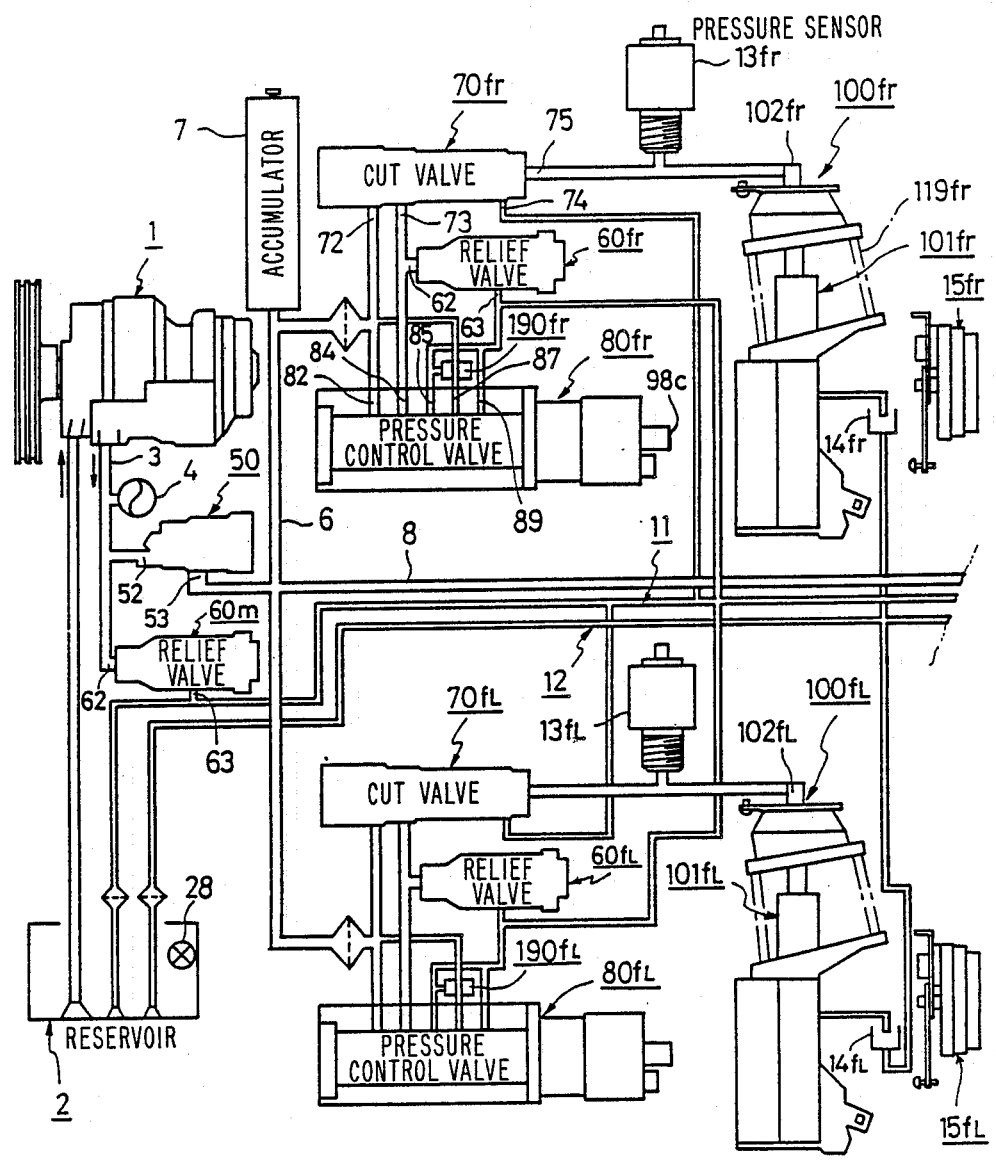
FIGS. 8a and 8b are block diagrams which, when combined together, illustrate a suspension pressure feeding system according to a second embodiment of the invention.
Figure 8B:
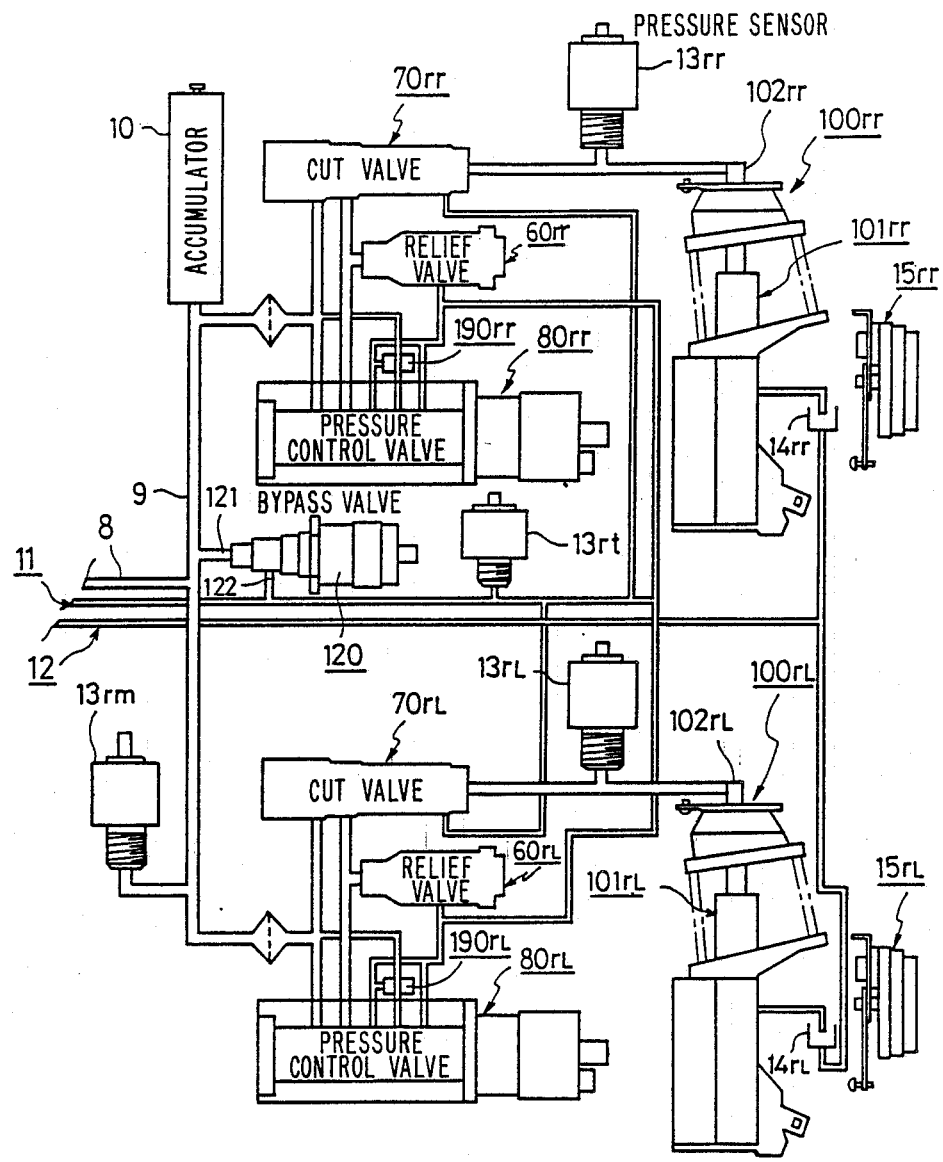

In a second embodiment shown in FIGS. 8a and 8b, low pressure ports (85) of the pressure control valves 80 fr, 80 fL, 80 rr and 80 rL are connected to low pressure accumulators 190 fr, 190 fL, 190 rr and 190 rL, respectively.

Figure 9:
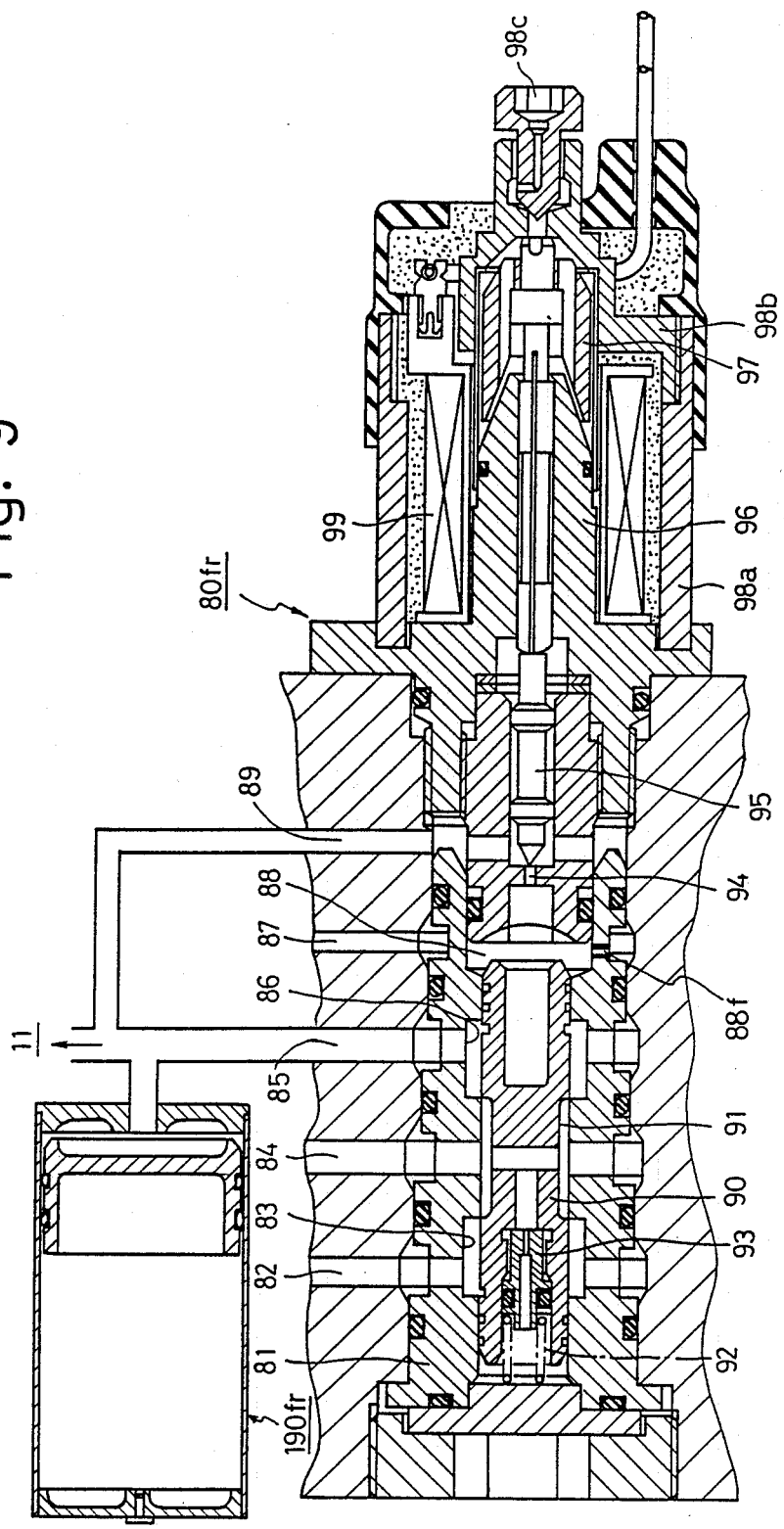

Referring to FIG. 9 which shows one combination of the pressure control valve and the low pressure accumulator in longitudinal section, to an enlarged scale, the low pressure port 85 and a low pressure port 89 are connected together in the immediate vicinity of the low pressure port 85 and is connected to the channel leading to the return path 11, and the low pressure accumulator 190 fr is connected to the both low pressure ports 85, 89.

The low pressure accumulator 190 fr includes a gas chamber in which a gas having a pressure equivalent to a low pressure reference (which is considered as representing a steady-state pressure) is confined. By way of example, if in response to an impulse-like pressure rise or fall as when a wheel or wheels are impacted upward or downward, the suspension pressure goes high or low, the spool 90 of the pressure control valve 80 fr will operate to suppress such change, displacing the oil pressure to raise or lower the pressure at the low pressure port 85 of the pressure control valve 80 fr. At this moment, the low pressure accumulator 190 fr connected to the low pressure port absorbs any pressure rise by its accumulating action, and discharges the accumulated pressure when a pressure fall occurs, thus smoothing the pressure which prevails in the vicinity of the low pressure port 85. Since the low pressure accumulator 190 fr is connected between the low pressure port 89 which is provided to withdraw pressure from the target pressure space 88 for pressure regulating purpose and the return path 11, a pressure fluctuation associated with the low pressure port 89 is also smoothed. This reduces an error involved with the target pressure which is established by the pressure control valve 80 fr and also reduces an error in the output pressure or suspension pressure, contributing to stabilizing the attitude control of the car body.

It is to be noted that other elements or parts of the second embodiment shown in FIGS. 8a and 8b, which have not been specifically described, remain the same as in the first embodiment.

In the second embodiment, low pressure accumulators 190 *fr*, 190 *fL*, 190 *rr*, 190 *rL* are provided one for each pressure control valve. However, a single accumulator may be associated with the both front wheels while another accumulator may be associated with the both rear wheels, thus using only two of the accumulators. Thus one of the accumulators may be connected to the common channel for the low pressure ports of the pressure control valves 80 *fr* and 80 *fL* (or to the return path 11 in the region located near the front wheels) and the other may be connected to the common channel for the low pressure ports of the pressure control valves 80 *rr* and 80 *rL* (or to the region of the return path 11 located near the rear wheels).

While preferred embodiments of the invention have been illustrated and described, it is to be understood that there is no intention to limit the invention to the precise constructions herein disclosed and the right is reserved to all changes and modifications coming within the scope of the invention as defined in the appended claims.

What we claim is:

1. Pressure control system for suspension comprising
a pressure source for supply a fluid which is drawn from a reservoir to a high pressure piping under a high pressure, which delivers a hydraulic fluid to a suspension which is adapted to extend and shrink in response to a pressure supplied thereto;
and a pressure control valve including a line pressure port communicating with the high pressure piping, a low pressure port communicating with a fluid return path to the reservoir, an output port applying a pressure to the suspension, a target pressure space communicating with the line pressure port through an orifice, a spool responsive to a pressure from the output port applied to its one end to be driven in a direction to reduce a degree of communication between the line pressure port and the output port and to increase a degree of communication between the low pressure port and the output port and also responsive to the pressure from the target pressure space applied to its other end to be driven in a direction to increase a degree of communication between the line pressure port and the output port and to reduce a degree of communication between the low pressure port and the output port, a valve element for defining a degree of communication between the target pressure space and the fluid return path to the reservoir, electrically driven drive means for driving the valve element in a direction to increase/decrease the degree of communication, and an orifice interposed in a channel between the fluid return path to the reservoir and an operating space for the valve element.

2. Pressure control system for suspension comprising
a pressure source for supplying a fluid which is drawn from a reservoir to a high pressure piping under a high pressure which delivers a hydraulic fluid to a suspension which is adapted to extend and shrink in response to a pressure supplied thereto;
a pressure control valve including a line pressure port communicating with the high pressure piping, a low pressure port, an output port for applying a pressure to the suspension, a target pressure space communicating with the line pressure port through an orifice, a spool responsive to a pressure from the output port applied to its one end to be driven in a direction to reduce a degree of communication between the line pressure port and the output port and to increase a degree of communication between the low pressure port and the output port and also responsive to a pressure from the target pressure space applied to its other end to be driven in a direction to increase a degree of communication between the line pressure port and the output port and to reduce a degree of communication between the low pressure port and the output port, a valve element for defining a degree of communication between the target pressure space and a fluid return path to the reservoir, and electrically driven drive means for driving the valve element in a direction to increase/decrease the degree of communication;
and a low pressure accumulator connected in a channel between the target pressure space of the pressure control valve and the fluid return path leading to the reservoir.

3. Pressure control system according to claim 2 in which the low pressure port of the pressure control valve is also connected to the low pressure accumulator.

4. Pressure control system for suspension comprising
a pressure source for supplying a fluid which is drawn from a reservoir to a high pressure piping under a high pressure which delivers a hydraulic fluid to a suspension which is adapted to extend and shrink in response to a pressure supplied thereto;
a pressure control valve for regulating a pressure from the high pressure piping to a pressure which varies in accordance with an electrical energization thereof before it is supplied to the suspension;
and a cut valve unit including a pilot pressure space responsive to a pressure from the high pressure piping, an input port responsive to a regulated pressure from the pressure control valve, an output port communicating with the suspension, a valve element driven by a pressure from the pilot pressure space for establishing a communication between the input port and the output port, a spring member for urging the valve element in a direction to interrupt the communication between the input port and the output port, and an orifice interposed between the pilot pressure space and a high pressure piping.

5. Pressure control system according to claim 4 in which the pressure control valve comprises a line pressure port communicating with the high pressure piping, a low pressure port communicating with a fluid return path to the reservoir, an output port for applying a pressure to the suspension, a target pressure space communicating with the line pressure port through an orifice, a spool responsive to a pressure from the output port applied to its one end to be driven in a direction to reduce a degree of communication between the line pressure port and the output port and to increase a degree of communication between the low pressure port and the output port and also responsive to a pressure from the target pressure space to be driven in a direction to increase a degree of communication between the line pressure port and the output port and to reduce a degree of communication between the low pressure port and the output port, a valve element for defining a degree of communication between the target pressure space and the fluid return path to the reservoir, and electrically driven drive means for driving the valve element in a direction to increase/decrease the degree of communication.

6. Pressure control system according to claim 5 in which the pressure control valve additionally includes an orifice interposed in a channel between the fluid return path to the reservoir and an operating space for the valve element.

7. Pressure control system according to claim 5, further comprising a low pressure accumulator connected in a channel between the target pressure space of the pressure control valve and the fluid return path to the reservoir.

8. Pressure control system according to claim 7 in which the low pressure port of the pressure control valve is connected to the low pressure accumulator.

* * * * *